June 28, 1949. A. W. TANNER Re. 23,130
SPOON, SHOVEL, OR THE LIKE IMPLEMENT WITH A PUSHER MEMBER
Original Filed Feb. 18, 1946 2 Sheets-Sheet 1
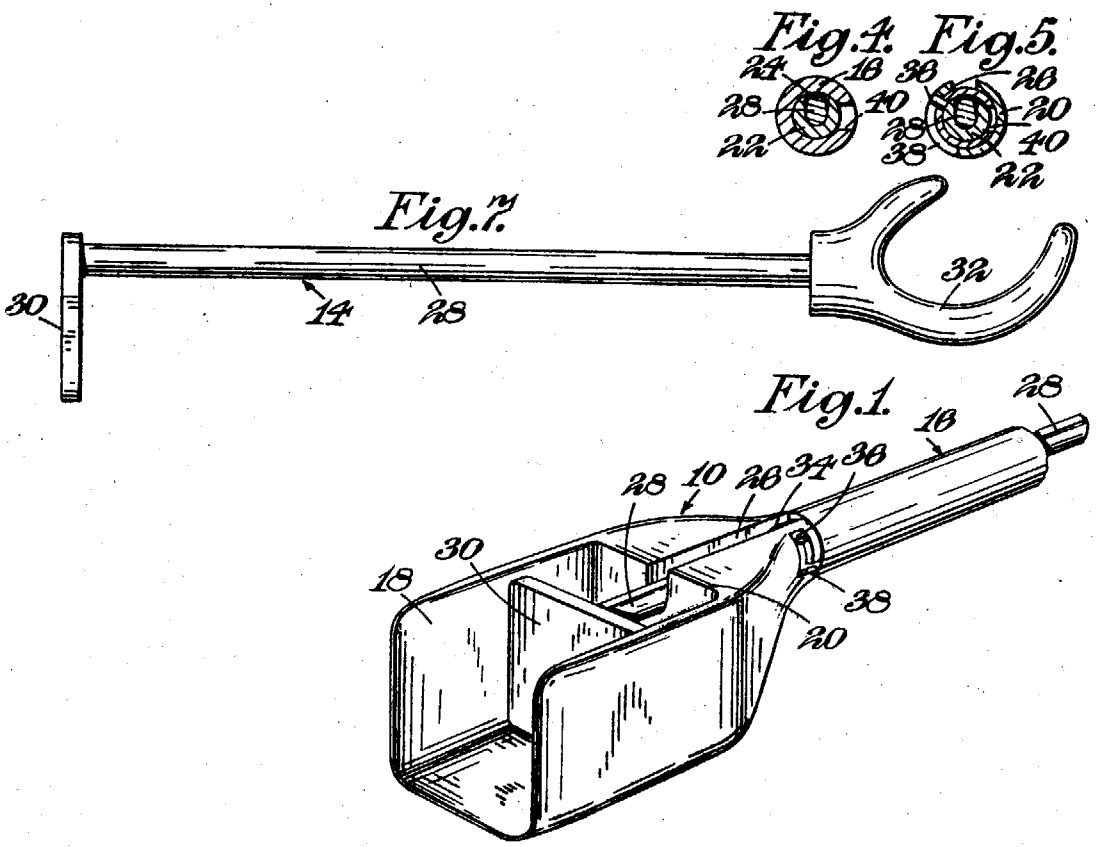
INVENTOR
Arthur W. Tanner
By Watson, Cole, Grindle + Watson June 28, 1949. A. W. TANNER Re. 23,130
SPOON, SHOVEL, OR THE LIKE IMPLEMENT WITH A PUSHER MEMBER
Original Filed Feb. 18, 1946 2 Sheets-Sheet 2
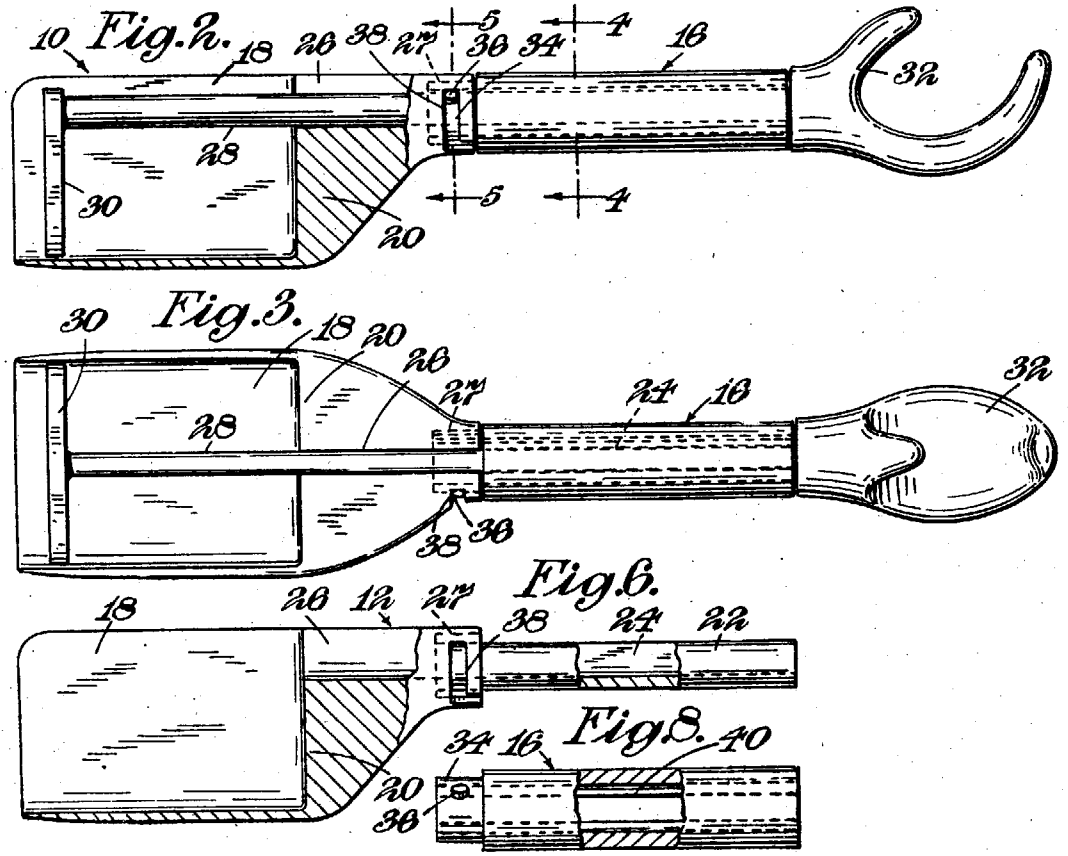
INVENTOR
Arthur W. Tanner
By Watson, Cole, Grindle + Watson Reissued June 28, 1949 Re. 23,130

UNITED STATES PATENT OFFICE 23,130

SPOON, SHOVEL, OR THE LIKE IMPLEMENT WITH A PUSHER MEMBER

Arthur William Tanner, Aldershot, England

Original No. 2,435,805, dated February 10, 1948, Serial No. 648,358, February 18, 1946. Application for reissue May 6, 1949, Serial No. 91,855. In Great Britain February 27, 1945

3 Claims. (Cl. 30—128)

This invention relates to spoons, shovels, and like implements, and has for its object to provide an improved construction from the bowl of which its contents can be readily removed positively.

According to the invention there is provided a spoon, shovel, scoop or like implement provided with a scraper or pusher member arranged to be moved in the bowl in the direction of its length so as positively to eject the contents thereof from the open end of the implement.

Preferably the implement has a hollow handle member or stem, in which an operating rod attached to the scraper or pusher member is movable endwise.

Conveniently the scraper member makes sliding contact with the bottom and sides of the bowl and it may have two flanges overlying the longitudinal edges of the bowl.

The operating rod may be removable from the bowl and from the handle member or stem by movement in a direction lying transversely of the length of the implement.

Conveniently the end portion of the bowl and the handle member or stem have each a longitudinal slot and the handle member or stem is surrounded by a rotatable sleeve having a longitudinal slot, which sleeve can be turned to move its slot into and out of alignment with the slots in an end wall of the bowl and stem for permitting removal and replacement of the scraper or pusher member and its rod.

One embodiment of the invention is diagrammatically illustrated by way of example in the accompanying drawings wherein:

Figure 1 is a perspective view of one construction of implement in the form of a spoon according to the invention, shown partly broken away, Figure 2 is a vertical longitudinal section through the implement.

Figure 3 is a top plan view thereof.

Figures 4 and 5 are cross sections taken respectively on the lines 4—4 and 5—5 in Figure 2, and Figures 6, 7 and 8 are detail views showing three component parts of the implement detached.

Like reference characters designate like parts throughout the several views.

Referring to the drawings, the implement in the form of a spoon, designated generally 10, adapted for use in feeding infants and invalids, comprises three component parts designated generally 12, 14 and 16, and illustrated respectively in Figures 6, 7 and 8. The part 12 comprises a bowl 18 in the form of a scoop of U-section having an outwardly tapered, relatively thick, rear part or end wall 20 lying at right angles to the direction of length of the implement. A hollow tubular handle member or stem 22 has in it a longitudinal slot 24, is integral with the part 20 and opens into a slot 26 in the top of the latter, placing it in open communication with the interior of the bowl, the slots 24 and 26 being in alignment one with the other. An annular recess 27 is formed in the part 20 at the adjacent end of the stem 22. The stem 22 accommodates part of an operating rod 28 which is slidable in it, carries at one end a scraper or pusher member 30 situated in the bowl 18, and has at its opposite end a handle member or grip 32 which may be screwed to the rod 28. The scraper member 30 is a plate which substantially conforms to the cross-sectional shape of the bowl 18, so that it makes a sliding, non-rotatable fit with the bottom and sides thereof. If the bowl is made semi-circular, then two, outwardly-directed flanges at opposite sides of the plate 30 may overlie the top longitudinal edges of the bowl, and thereby prevent rotation of the plate and its operating rod about the longitudinal axis of the handle member. Alternatively, this rotation may be prevented by making the rod 28 of non-circular cross-section, as illustrated, so that it is not rotatable in the slot 24 in the stem 22.

In order to retain the rod 28 in position in the stem 22, the latter is rotatably surrounded by the sleeve 16 which may be readily detachably connected in any known manner to the end portion 20 of the bowl. As shown, one end of the sleeve 16 is reduced at 34 to enter the annular recess 27, and carries a pin 36 of a bayonet joint having an L-shaped slot 38 formed in the adjacent recessed end of the part 20 of the bowl. As shown most clearly in Figures 4 and 8, this sleeve 16 also has a longitudinal slot 40. By turning the sleeve, the slot 40 can be placed in a position lying above the slot 24 in the stem and in register with the slot 26, so that the rod 28 and its plate 30 can be lifted out of the implement for cleaning purposes.

When in use for feeding an infant, the scraper plate 30 will lie against the end wall 20 of the bowl which will then receive the food, either solid or liquid, and after placing the bowl at or in the mouth of the infant the scraper member will be pushed away from the end wall, thereby positively ejecting the food out of the bowl into the mouth of the infant. When it is desired to dismember the spoon entirely for cleaning purposes, the component part 12 will be removed as described above, and the sleeve 16 will be disconnected from the bowl by breaking the bayonet joint. When the parts have been re-assembled and placed in the position shown in Figures 1 to 5, the rod 28 and plate 30 are prevented from being inadvertently removed from the implement.

The implement may be made of any convenient material, such as plastics, metal or wood, and it may be used for feeding medicine to invalids, as well as for other purposes, particularly for handling sticky substances which are liable to adhere to a spoon, shovel or the like as usually constructed at the present day.

Various modifications may be made in the details of construction described above without departing from the invention.

I claim:

1. An implement of the character described comprising a hollow handle member, and a bowl carried thereby, which handle member has a lateral opening extending from end to end thereof, in combination with a pusher member movable in the bowl in the direction of its length, and an operating rod that has one end portion attached to the pusher member, extends through the handle member, and has its other end portion situated outside the handle member, which pusher member and operating rod are removable from the implement by movement in a direction transverse to the length thereof.

2. An implement as set forth in claim 1, wherein an end portion of the bowl and the handle member have each a longitudinal slot, and a rotatable sleeve having a longitudinal slot surrounds the handle member, and can be turned to move its slot into and out of alignment with the slots in the end portion of the bowl and in the handle member for permitting removal and replacement of the pusher member and its rod.

3. An implement as set forth in claim 1, wherein an end portion of the bowl and the handle member have each a longitudinal slot, and a rotatable sleeve which surrounds the handle member has a longitudinal slot and is detachably attached to the bowl by a bayonet joint, which sleeve can be turned to move its slot into and out of alignment with the slots in the end portion of the bowl and in the handle member for permitting removal and replacement of the pusher member and its rod.

ARTHUR WILLIAM TANNER.

No references cited.